UNITED STATES PATENT OFFICE.

EDWARD LACEY ANDERSON, OF ST. LOUIS, MISSOURI, ASSIGNOR TO JOHN A. GILLIAM, TRUSTEE, OF ST. LOUIS, MISSOURI.

PROCESS OF PURIFYING ALUMINIUM.

SPECIFICATION forming part of Letters Patent No. 716,977, dated December 30, 1902.

Application filed July 27, 1901. Serial No. 69,878. (No specimens.)

*To all whom it may concern:*

Be it known that I, EDWARD LACEY ANDERSON, a citizen of the United States, residing at the city of St. Louis, in the State of Missouri, have invented a certain new and useful Process of Purifying Aluminium, of which the following is such a full, clear, and exact description as will enable any one skilled in the art to which it appertains to practice the same.

All commercial aluminium contains impurities, generally in the form of silicates of aluminium. Pure aluminium is a bright metal which does not oxidize or tarnish when exposed to air. The impurities or silicates of aluminium tarnish and oxidize in air and give the metal a mottled or dull luster.

The object of my invention is to remove these impurities from aluminium, so as to produce a metal of bright luster and which does not oxidize or tarnish in the air. My process produces aluminium which shows a surface somewhat like silver, having what is known as a "satin finish."

One solution embodying my invention and giving good results is made as follows: To two pounds of nitric acid is added five pounds of water, the water being added in small quantities at a time, and when this is cool one pound of bichromate of potash is added. The whole is allowed to stand about one hour, when about one pound of calcium fluorid is added. The aluminium is then placed in the solution and allowed to stand about ten to fifteen minutes. At the end of this time the aluminium is taken out and washed with water. It is then ready for use. Apparently in the use of this solution hydrofluoric acid and chromic acid are formed. When the metal is placed in contact with the solution, bubbles of hydrogen are given off. This hydrogen is absorbed by the chromic acid present, with the oxygen of which it enters into combination.

Having fully described my invention, what I claim as new, and desire to secure by Letters Patent of the United States, is—

1. The process of finishing aluminium, which consists in treating the surface thereof with hydrofluoric acid, and removing from said surface during said treatment the gas thereby generated.

2. The process of finishing aluminium, which consists in treating the surface thereof with hydrofluoric acid, and continuously removing from said surface during said treatment the gas thereby generated.

3. The process of finishing aluminium, which consists in immersing the same in a solution containing hydrofluoric acid, and continuously removing from the surface of said aluminium while same is immersed the gas thereby generated.

4. The process of finishing aluminium, which consists in immersing the same in a solution containing hydrofluoric acid, and continuously removing chemically from the surface of said aluminium while same is immersed the gas generated thereby.

5. The process of treating aluminium, which consists in subjecting the same to the action of hydrofluoric acid in the presence of a hydrogen absorbent.

6. The process of treating aluminium, which consists in subjecting the same to the action of hydrofluoric acid in the presence of an oxygen-affording agent.

7. The process of treating aluminium, which consists in subjecting the same to the action of hydrofluoric acid in the presence of chromic acid.

8. The process of treating aluminium, which consists in subjecting the same to the action of a solution of a metallic fluorid, an acid capable of decomposing said fluorid, and a hydrogen absorbent.

9. The process of treating aluminium, which consists in subjecting the same to the action of a solution of a metallic fluorid, an acid capable of decomposing said fluorid, and a chromate of a metal.

10. The process of treating aluminium, which consists in subjecting the same to the action of a solution of calcium fluorid, nitric acid, and a chromate of a metal.

In testimony whereof I have hereunto set my hand and affixed my seal in the presence of the two subscribing witnesses.

EDWARD LACEY ANDERSON. [L. S.]

Witnesses:
A. C. FOWLER,
W. A. ALEXANDER.